United States Patent
Covelli

(10) Patent No.: US 10,188,952 B1
(45) Date of Patent: Jan. 29, 2019

(54) METHOD FOR DYNAMICALLY MAPPING SERVERS

(71) Applicant: Controlled Protocols, Inc., Mineola, NY (US)

(72) Inventor: Ralph J. Covelli, Westbury, NY (US)

(73) Assignee: Controlled Protocols, Inc., Mineola, NY (US)

( * ) Notice: Subject to any disclaimer, the term of this patent is extended or adjusted under 35 U.S.C. 154(b) by 0 days.

(21) Appl. No.: 15/378,795

(22) Filed: Dec. 14, 2016

Related U.S. Application Data

(60) Provisional application No. 62/269,310, filed on Dec. 18, 2015.

(51) Int. Cl.
| | | |
|---|---|---|
| G06F 15/16 | (2006.01) |
| A63F 13/77 | (2014.01) |
| A63F 13/35 | (2014.01) |
| A63F 13/537 | (2014.01) |
| A63F 13/358 | (2014.01) |

(52) U.S. Cl.
CPC .............. *A63F 13/77* (2014.09); *A63F 13/35* (2014.09); *A63F 13/358* (2014.09); *A63F 13/537* (2014.09)

(58) Field of Classification Search
CPC .............................. A63F 13/358; A63F 13/822
See application file for complete search history.

(56) References Cited

U.S. PATENT DOCUMENTS

| | | | | |
|---|---|---|---|---|
| 5,736,990 A | * | 4/1998 | Barrus | G06T 11/00 345/630 |
| 6,767,287 B1 | * | 7/2004 | Mcquaid | A63F 13/12 463/29 |
| 6,801,930 B1 | * | 10/2004 | Dionne | H04L 41/00 463/32 |
| 7,590,736 B2 | * | 9/2009 | Hydrie | H04L 29/06 709/226 |
| 8,057,307 B2 | * | 11/2011 | Berstis | G07F 17/32 455/453 |
| 8,259,597 B1 | | 9/2012 | Oak | |
| 2003/0008712 A1 | * | 1/2003 | Poulin | A63F 13/12 463/42 |
| 2003/0177187 A1 | * | 9/2003 | Levine | A63F 13/10 709/205 |
| 2003/0195735 A1 | * | 10/2003 | Rosedale | G06F 17/5009 703/13 |
| 2006/0031578 A1 | * | 2/2006 | Pelletier | A63F 13/12 709/245 |

(Continued)

OTHER PUBLICATIONS

Information Sciences Institute, Internet Protocol—DARPA Internet Program Protocol Specification, RFC 791, Sep. 1981. [https://tools.ieff.org/html/rfc791].

(Continued)

*Primary Examiner* — Lawerence Galka
(74) *Attorney, Agent, or Firm* — Keusey & Associates, P.C.

(57) ABSTRACT

A method for variable sized summarization of n-dimensional integral coordinate systems. A three or other dimensional area is defined with an integral coordinate system. Blocks are defined within the three or other dimensional area with coordinate summary addresses. The coordinate addresses are mapped to server coordinates so that each block can be independently stored on one or more servers.

13 Claims, 10 Drawing Sheets

Resolving a Position to a /20 /20 /20 Summary Address Coordinate

(56) References Cited

U.S. PATENT DOCUMENTS

| | | | |
|---|---|---|---|
| 2010/0146128 A1* | 6/2010 | Kulkarni | H04L 63/0227 709/228 |
| 2010/0275136 A1* | 10/2010 | Gower | H04L 67/38 715/757 |
| 2012/0208636 A1 | 8/2012 | Feige | |
| 2013/0253675 A1* | 9/2013 | Kurabayashi | A63F 13/12 700/91 |

OTHER PUBLICATIONS

V. Fuller et al, Classless Inter-Domain Routing (CIDR): an Address Assignment and Aggregation Strategy, RFC 1519, Sep. 1993. [https://tools.ietf.org/html/rfc1519].

T. Pummill et al, Variable Length Subnet Table for IPv4, RFC 1860, Oct. 1995. [https://tools.ietf.org/html/rfc1860].

* cited by examiner

Example /20 /20 /20 Summary Address Coordinate

Resolving a Position to a /20 /20 /20 Summary Address Coordinate

524288/20 0/20 524288/20 (A)  ==  524288/20  0/20  524288/20 (B)

1 to 1 Summary Address Equivalence 1 to 2 Summary Address Equivalence

524288/20 0/20 524288/20 (A)  ==  524288/20 0/20 1048576/21 (B) +
524288/20 0/20 1048577/21 (C)

1 to 2 Summary Address Equivalence

524288/20 0/20 524288/20 (A)  ==  1048576/21 0/20  524288/20 (B) +
                                  1048577/21 0/20 1048576/21 (C) +
                                  1048577/21 0/20 1048577/21 (D)

1 to 3 Summary Address Equivalence

524288/20 0/20 524288/20 (A)  ==  1048576/21 0/20 1048576/21 (B) +
                                  1048576/21 0/20 1048577/21 (C) +
                                  1048577/21 0/20  524288/20 (D)

1 to 3 Summary Address Equivalence

524288/20 0/20 524288/20 (A) == 1048576/21 0/20 1048576/21 (B) +
1048577/21 0/20 1048576/21 (C) +
524288/20 0/20 1048577/21 (D)

1 to 3 Summary Address Equivalence

524288/20 0/20 524288/20 (A)  ==  524288/20 0/20 1048576/21 (B) +
                                   1048576/21 0/20 1048577/21 (C) +
                                   1048577/21 0/20 1048577/21 (D)

1 to 3 Summary Address Equivalence

524288/20 0/20 524288/20 (A)  ==  1048576/21 0/20 1048576/21 (B) +
                                  1048576/21 0/20 1048577/21 (C) +
                                  1048577/21 0/20 1048576/21 (D) +
                                  1048577/21 0/20 1048577/21 (E)

1 to 4 Summary Address Equivalence

METHOD FOR DYNAMICALLY MAPPING SERVERS

CROSS-REFERENCE TO RELATED APPLICATIONS

This application claims the benefit under 35 U.S.C. § 119(e) from U.S. Provisional Patent Application No. 62/269,310 entitled A Method for Variable Sized Summarization of n-dimensional Integral Coordinate Systems filed Dec. 18, 2015.

BACKGROUND OF THE INVENTION

1. Field of the Invention

This document refers to technologies in the field of online game systems, and more particularly a method for variadic summarization of n-dimensional integral coordinate systems.

2. The Prior Art

Many online games depend on large amounts of players being able to interact with each other. This was traditionally done with a single server. There are many methods to attempt to distribute the load across multiple servers. Often these methods rely on elements specific to the game they are created for. They usually need to implement some kind of bottleneck or load screen.

One example is U.S. Patent Application Publication 2012/0208636 entitled Methods, Server System and Browser Client for Providing a Game Map of a Browser-Based Online Multi-Player Game. The system uses actions from one browser to update the scene for a second player using a second browser. In addition, the game takes map portions that are no longer visible and shifts them in front of the user to extend the map. The system does not allow new blocks to be freely added, but rather recycles old blocks which limits the interest and creativity of the game and game designers. In addition, the system does not provide addressing so that blocks can be stored on different servers.

A technique in the related field of network design for segmenting network space with /xx notations can be seen in the following reference: RFC1860 https://tools.ietf.org/html/rfc1860 "Variable Length Subnet Table".

What is needed for large scale networks is a method of distribution that is based on the fundamental properties of the space that is being distributed.

SUMMARY OF THE INVENTION

This method was created to allow online games that use integral coordinate systems to be distributed across many servers by mapping in game coordinate addresses to server coordinate addresses. Simple bitwise logic can be used to extract the server coordinate address from the in game coordinate address. Server coordinates are then mapped to IP network addresses. This allows systems to be designed to hand off players between servers and interconnect servers with each other based on their coordinates.

The method is directed to variable sized summarization of n-dimensional integral coordinate systems. The first step includes defining a three dimensional area with an integral coordinate system. Coordinate addresses are then mapped to server coordinates so that each block can be independently stored on one or more servers. Variadic is defined as an integral value that defines the degree of summarization for 3, 4 or greater dimensional coordinate systems.

The coordinate address includes an X, Y and Z component. Each component includes a Summary Address portion and an Internal Address portion.

The three dimensional area is a virtual space stored on servers and forming a backdrop for an online video game.

The virtual space is divided into blocks. As players enter a block, the server coordinate address is extracted from the coordinate address of the block.

Additional blocks can be freely added and independently stored on any server within the system. The systems primary advantage is its scalability.

In a practical implementation of the invention there is provided a non-transitory computer readable medium including a program of instructions for variadic summarization of n-dimensional integral coordinate systems that when executed by a computer. The program performs the steps of first defining a three dimensional area with an integral coordinate system, and second mapping coordinate addresses to server coordinates so that each block can be independently stored on one or more servers. The defining step includes defining a three dimensional area with an integral coordinate systems by providing coordinate addresses, wherein each coordinate address includes an X, Y and Z component. Each component includes a Summary Address portion and an Internal Address portion. The three dimensional area is a virtual space stored on the servers and forms a backdrop for an online video game, and each coordinate address is a position coordinate address of a video game player within the virtual space. The dimensional area is a four, five or greater integral-value dimensional area and each coordinate address includes four, five or more components.

The three dimensional area is a virtual space stored on the servers and forms a backdrop for an online video game. The virtual space is divided into blocks. Logical blocks can be freely and independently added and stored on any server. Following the mapping step, the method further includes the step of extracting the server coordinates from the position coordinate address of the video game player. In other words, the server coordinates are extracted from the coordinate address of the video game player in response to the motion of the player.

The program further hands off players between servers in response to the motion of the player. The independent storage of blocks to servers allows the game designers to implement various load balancing schemes. One load balancing scheme involves load balancing by players naturally moving between servers.

Coordinate address are mapped to server coordinates by providing server coordinate addresses. Mapping includes extracting the server coordinate address from the coordinate address utilizing bitwise logic. A coordinate address can be dynamically re-mapped to different server coordinates for maintenance, load balancing or to expand game capacity.

The defining step includes defining a three dimensional area comprising a virtual online video game space stored on the servers with a coordinate address that represents a video game player's location within the virtual online video game space. The coordinate address includes an embedded and freely assignable server address. The mapping step includes mapping the coordinate addresses to server coordinate addresses by extracting the server coordinate address from the coordinate address using bitwise logic.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the document.

DETAILED DESCRIPTION OF THE PREFERRED EMBODIMENTS

The invention relates to technical implementations of networking and online gaming systems.

Figure 1:
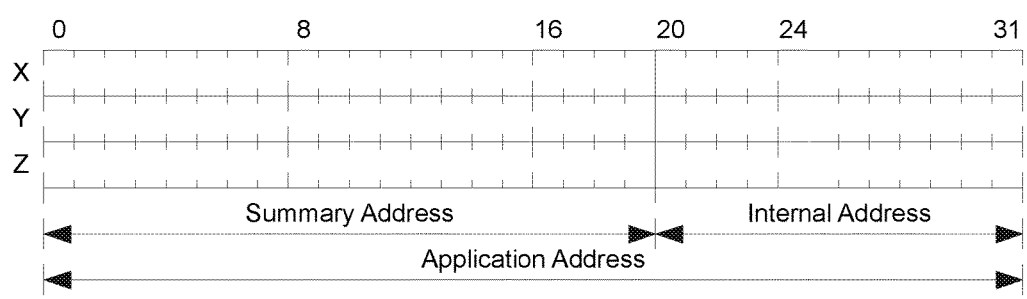
FIG. 1 is a diagram showing an example of a three part /20, /20, /20 summary coordinate address.

FIG. 1 is an exemplary depiction of a third dimensional addressing system, labeled Example /20/20/20 Summary Address Coordinate. The three 32 bit integers are coupled together to form an absolute X,Y,Z coordinate. The most significant bits of each dimension of the coordinate are used to create the summary address. In this case the first 20 bits are used for the summary address. This can be used as a server address. The last 12 bits of each dimension signify an address internal to the server. This particular example shows a server that is 4,096 addresses in length along each of the three dimensions of the server. That is $2^{12}$ which gives 4,096 addresses. More or less bits may be employed to increase or decrease the number of available addresses.

Figure 3:
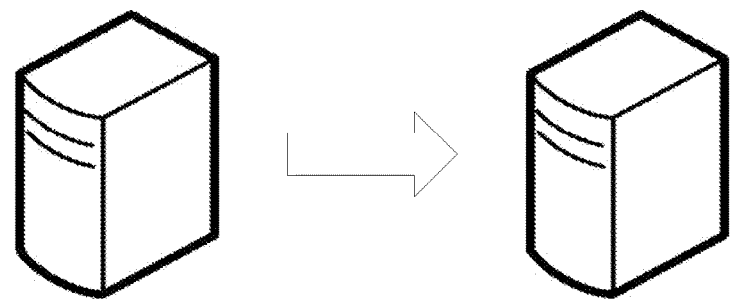
FIG. 3 is a diagram presenting a 1 to 1 summary address equivalence example.
Figure 3:
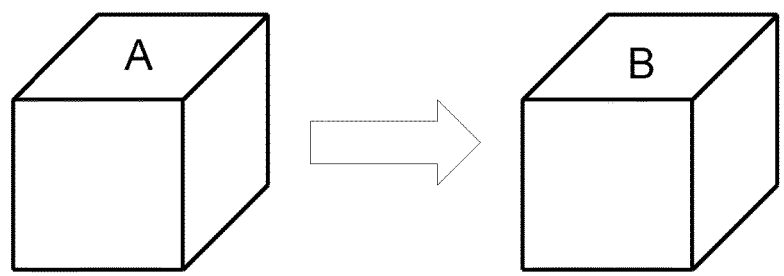
Figure 3:
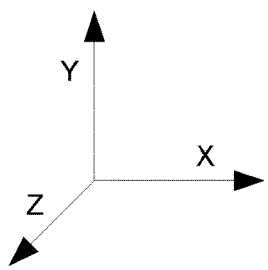

Internally, there are 68/719,476,736 addresses in this server. That is 4,096 addresses for each of the X, Y and Z coordinates. Or, 4096×4,096×4,096=68,719,476,736. This example is currently being used to designate addresses to blocks in a game similar to Minecraft. The individual blocks are further divided in a manner which is beyond the scope of this application. FIG. 3 is a depiction of summary address equivalencies, labeled 1 to 1 Summary Address Equivalence. It shows the address of space A mapped to itself. The network addressing scheme is orientation neutral. In these examples the landmass has been oriented along the X, Z plane. The Y dimension is oriented towards the sky. This is why all the server addresses in this example lie on the Y zero plane. The orientation of the world is defined by the game designer. The values 524288/20, 0/20, 524288/20 were chosen as an example server to dissect. This address borders the center of the X, Z dimensional plane but against the lowest bounds of the Y dimension.

Figure 4A:
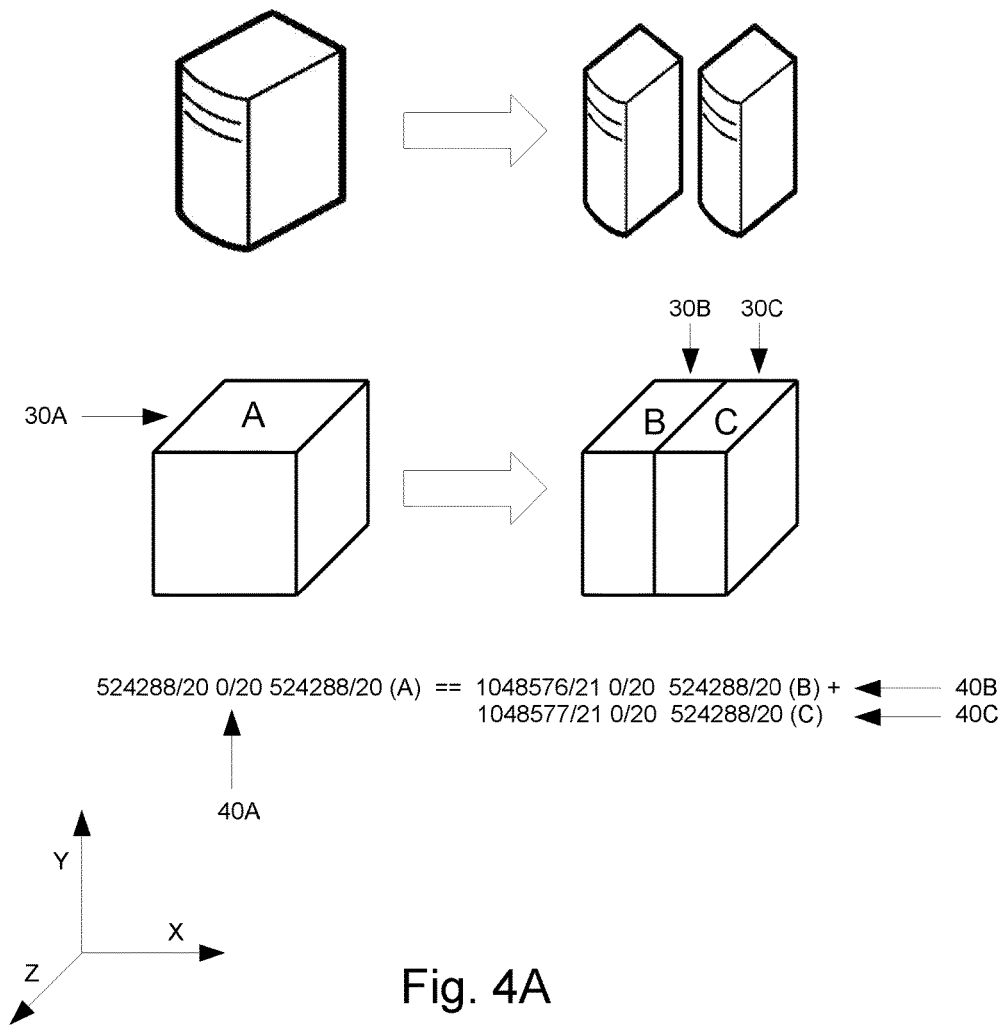
FIGS. 4A and 4B are diagrams presenting 1 to 2 summary address equivalence examples.
Figure 4B:
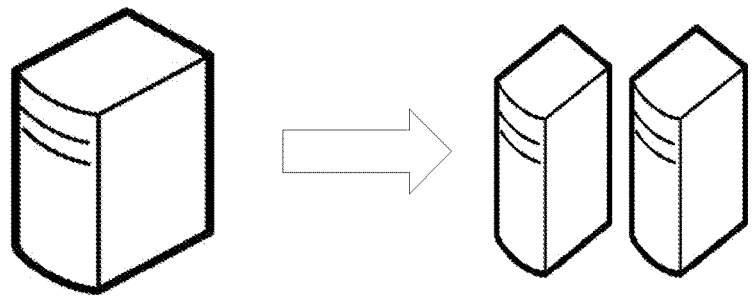
Figure 4B:
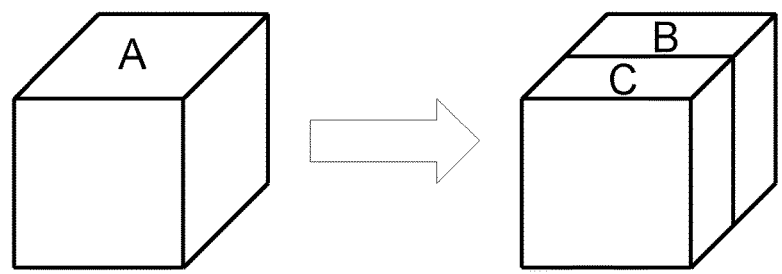
Figure 4B:
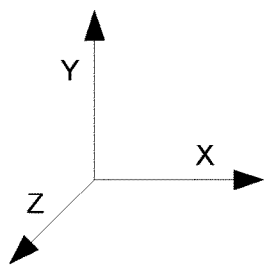

FIGS. 4A and 4B, labeled 1 to 2 Summary Address Equivalence, show space A with a single address, and then the same area divided into space B and C. The /21 coordinate equivalence is exactly twice the length of the /20 on each respected dimension. This is because of the extra bit in the server space. The extra bit allows for twice the amount of servers along that dimensional axis. Since this bit was taken from the internal address space the server is half the length along that same axis. This is known as a two way split.

The following points related to the addresses depicted in the drawings

1) The address system can be thought of as IP CIDR addresses combined with X Y Z coordinates 2) IP CIDR (Classless Inter Domain Routing) examples:
IP/Mask where Mask is the number of bits from the most significant bit that indicate the network part of the IP address.
192.168.0.0/24=192.168.0.0 thru 192.168.0.255=256 addresses
192.168.0.0/23=192.168.0.0 thru 192.168.1.255=512 addresses
192.168.0.0/23=192.168.0.0/24+192.168.1.0/24
192.168.0.0/16=65,536 addresses
0.0.0.0/0 stands for the entire space (0.0.0.0 thru 255.255.255.255)
10.2.3.4/32 defines a single address (10.2.3.4)
The following references provide a more complete description of IP CIDR.
RFC791 https://tools.ietforg/html/rfc791 "Internet Protocol Specification"
RFC1519 https://tools.ietf.org/html/rfc1519 "Classless Inter-Domain Routing"
RFC1860 https://tools.ietf.org/html/rfc1860 "Variable Length Subnet Table"
The content of these references is incorporated herein by reference thereto.

3) Server coordinate addresses describe 3 things
a) Server location
b) Server size
c) Server shape 4) Instead of IP/Mask we use X/XMask, Y/YMask, Z/ZMask 5) All the example figures occupy the same /20, /20, /20 chunk of space in the networks universe. They are equivalent.

FIGS. 5A, 5B, 5C and 5D, labeled 1 to 3 Summary Address Equivalence, show space A with a single address, and then the same area divided into three spaces B, C and D. The /21 coordinate equivalence is exactly twice the length of the /20. This is because of the extra bit in the server space. This is known as a three way split.

Figure 5A:
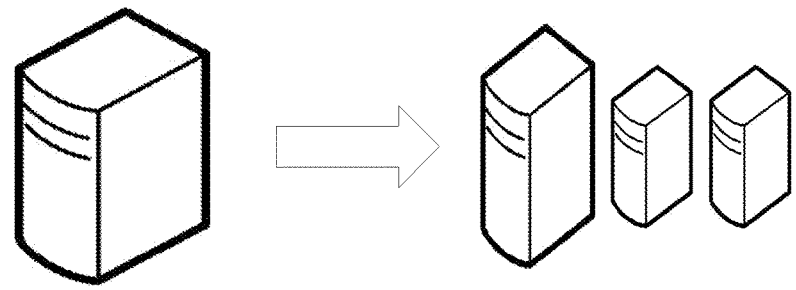
FIGS. 5A-5D are diagrams presenting 1 to 3 summary address equivalence examples.
Figure 5A:
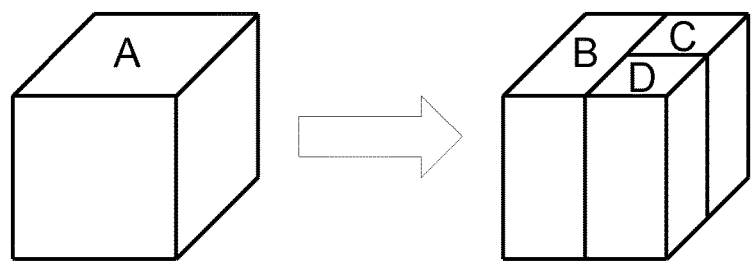
Figure 5A:
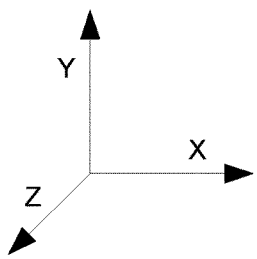
Figure 5B:
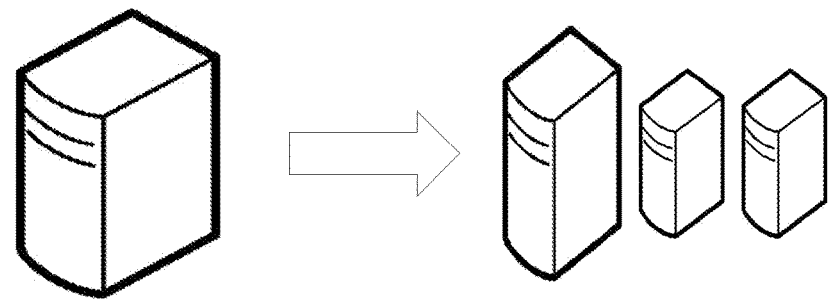
Figure 5B:
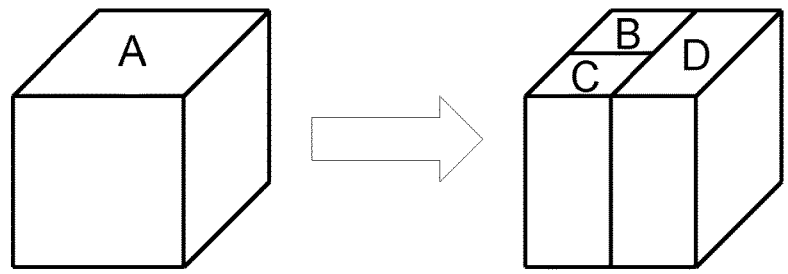
Figure 5B:
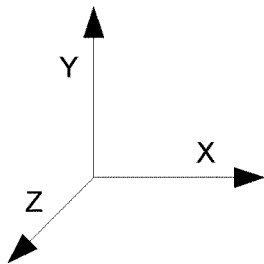
Figure 5C:
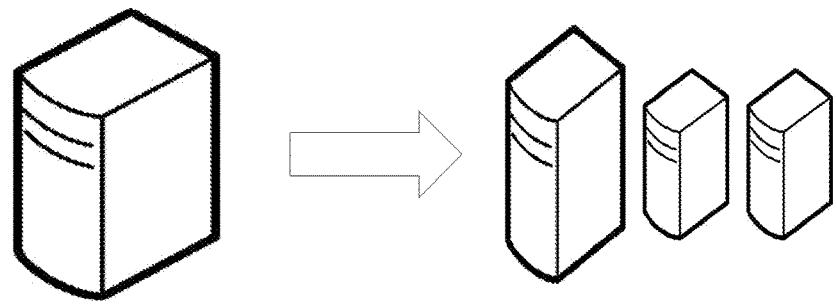
Figure 5C:
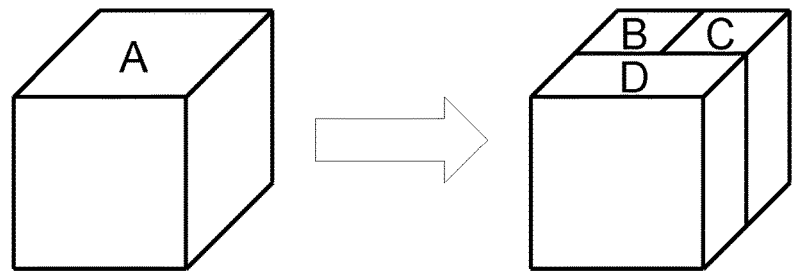
Figure 5C:
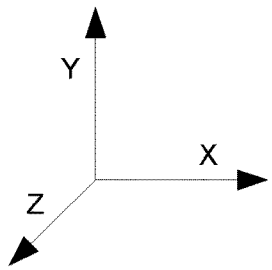
Figure 5D:
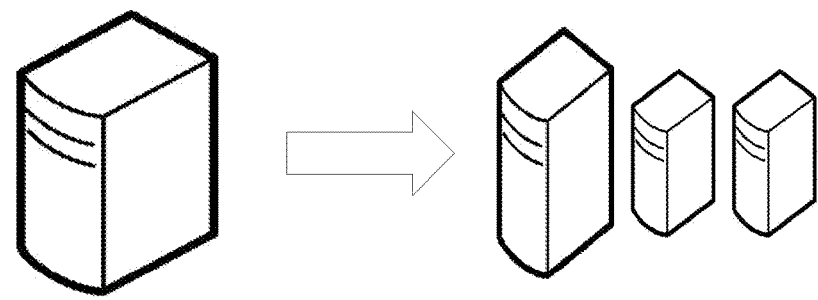
Figure 5D:
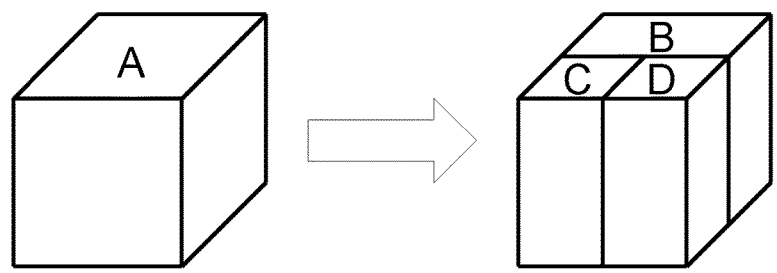
Figure 5D:
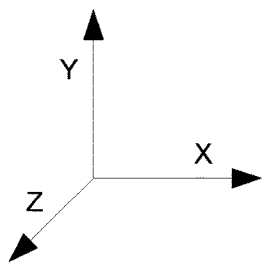

In FIG. 5A, the Z coordinate of the B space is the same as the A space, since they cover the same distance in the Z direction. Accordingly, for the B space, the Z coordinate has a /20 coordinate equivalence. In contrast, the C and D spaces have /21 Z coordinates, representing twice the available server space since two spaces (C and D) are present in place of the single A space. In the X coordinate, each of the B, C and D spaces has a /21 coordinate equivalence representing twice the available space.

Figure 6:
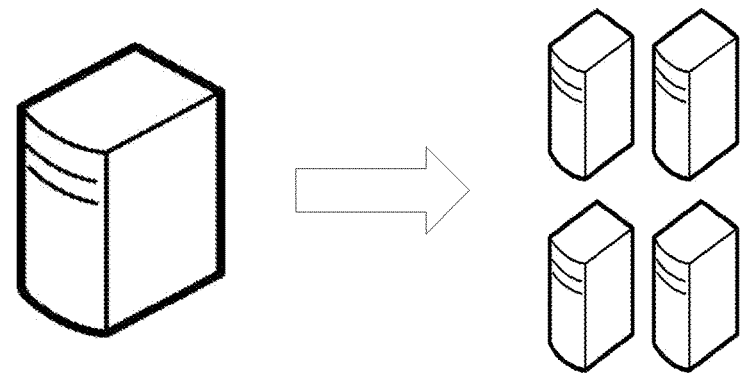
FIG. 6 is a diagram presenting a 1 to 4 summary address equivalence example.
Figure 6:
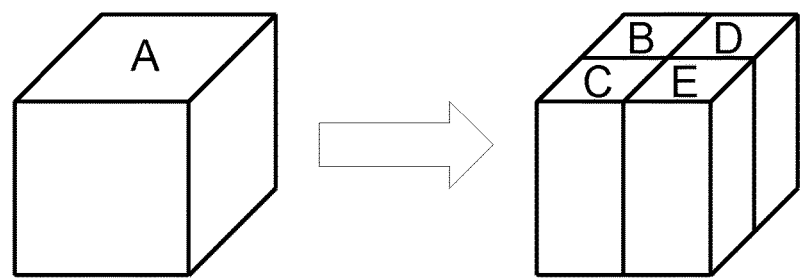
Figure 6:
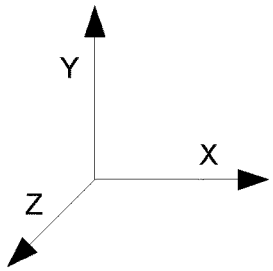

FIG. 6, labeled 1 to 4 Summary Address Equivalence, shows a 1 to 4 split. In the X and Z coordinates all of B, C, D and E spaces have a /21 coordinate addresses.

The use of multiple server sizes can be used for network shaping or in response to resource considerations. Networks can also be implemented to allow multiple server sizes or restrict the network to servers of a single size.

The invention utilizes software, or a program of instruction, to define a multi-dimensional area with an integral coordinate system. At is most basic level a 2-dimensional area can be defined. In the diagrams a 3-dimensional area is defined using a three axis coordinate system, where the Y coordinate is always zero, effectively modeling a mostly 2-dimensional area oriented to the landscape.

The Defining Step—

Figure 2:
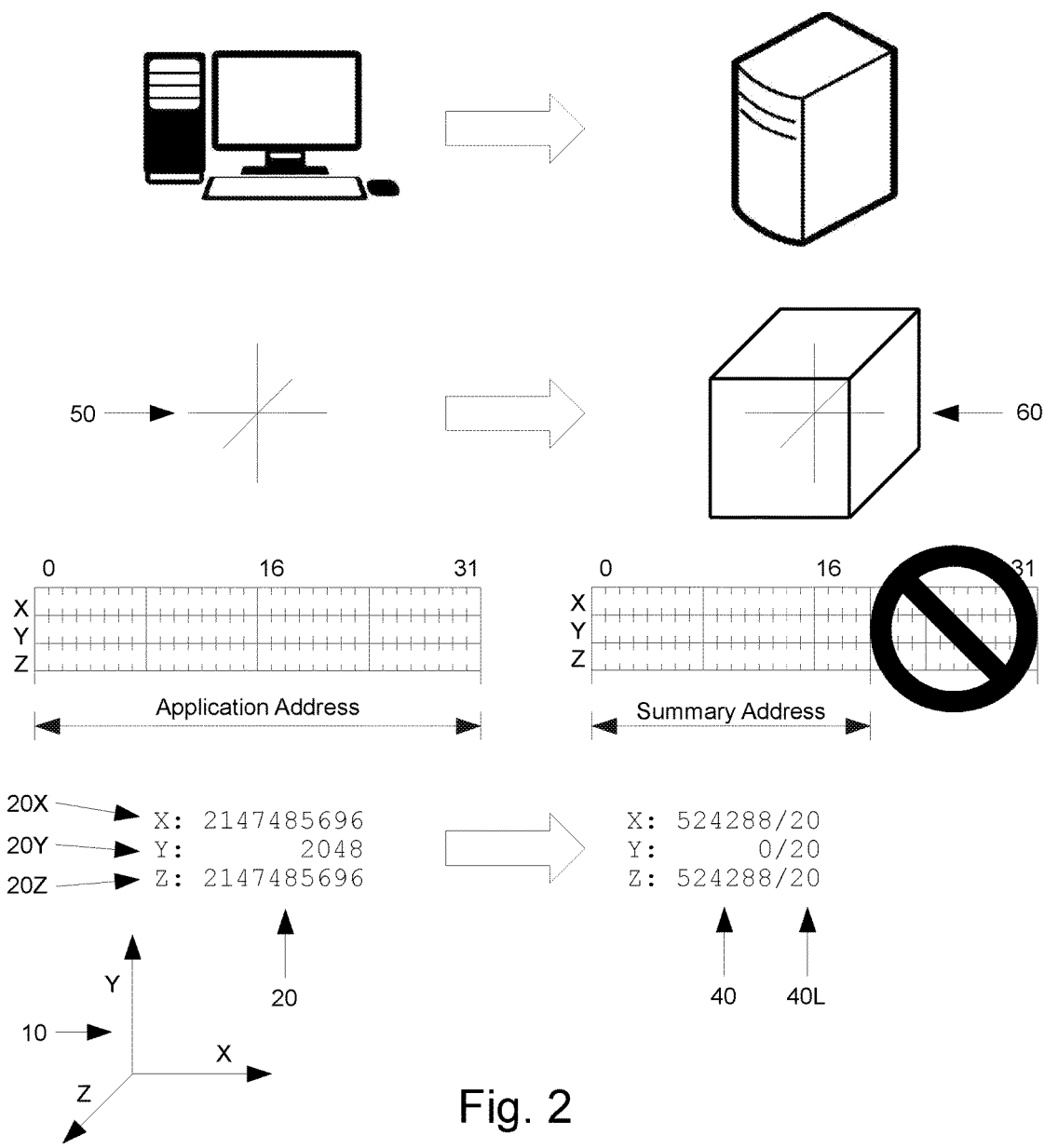
FIG. 2 is a diagram showing resolving a position to a /20, /20, /20 summary address coordinate.

FIG. 2 shows how three dimensional position 50, defined by a 3 part coordinate address 20, composed of components 20x, 20y, 20x and aligned with orientation 10, can be mapped to three dimensional area 60 defined by a 3 part coordinate summary address 40. In one embodiment, the three dimensional area is a virtual space created by the game software that resides in computer storage and is translated into an environment that is displayed to a user.

The Mapping Step—

FIG. 2 schematically illustrates how the coordinate addresses 20x, 20y, 20z are mapped to server coordinates 40. Position 20 is mapped to summary coordinate address 40 by preforming a bit-wise logical "and" between the position address 20 and a "1" bit-mask of length 40L on each respected dimension. This is a one way process because information is lost in the mapping. A particular position may be mapped to a chunk of space but a chunk of space cannot be mapped to a particular position. FIG. 4A shows that the same coordinates 40 that are assembled into a single string 40A. If server coordinates 40A are mapped, then the user is directed to an area 30A that resides in Block A, or server A. Alternatively, the coordinate addresses 20x, 20y, 20z could have been mapped to server coordinates 40B or 40C, directing the user to an area 30B in Block B or an area 30C in Block C, that is server B or C. By changing the mapping from 40A to 40B or 40C, the directed block can be stored on any server. In this manner, blocks can be expanded, removed or transferred for maintenance or load balancing of servers.

The addressing system can be implemented to allow server space overlap. In these cases the smaller servers have priority. Servers of equal sizes can be used for load balancing internal server space. The addressing system can also be implemented to never allow address overlap. Various methods can be used to implement collision handling in these instances.

The steps of the present invention can be implemented by hardware components, software components or an embodiment including both hardware and software elements. In a preferred embodiment, the present invention is implemented in software, which includes but is not limited to firmware, resident software, microcode, etc.

The invention may comprise a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A client and/or server system suitable for storing and/or executing program code may include at least one processor coupled directly or indirectly to memory elements through a system bus. The memory elements may include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled between the client side and the server system to enable coupling to client an/or server systems or storage devices through intervening private or public networks. Modems, cable modem and Ethernet cards are just a few of the currently available types of network adapters.

Having described preferred embodiments summarization of multi-dimensional coordinate system applications (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A non-transitory computer readable medium including a program of instructions for dynamically mapping a plurality of servers that when executed by a computer performs the steps of:

defining a three dimensional area of a virtual space divided into independently storable blocks with an integral coordinate system by providing coordinate addresses that have an X, Y and Z component, wherein each component includes a summary address portion and an internal address portion;

mapping coordinate addresses that represent a position within the virtual space to server coordinates, wherein the coordinate address includes an embedded and freely assignable server address so that each block can be transferred and independently stored on one or more of the plurality of servers;

adding a block to any one of the plurality of servers to expand beyond the defined three dimensional area; and dynamically re-mapping the coordinate address to reflect the new server coordinates of the added block.

2. The computer readable medium of claim 1, wherein the three dimensional area is a virtual space stored on the servers and forms a backdrop for an online video game, and each coordinate address is a position coordinate address of a video game player within the virtual space.

3. The computer medium of claim 1, wherein said dimensional area is a three dimensional area and each coordinate address include three components.

4. The computer readable medium of claim 3, wherein the virtual space forms a backdrop for an online video game.

5. The computer readable medium of claim 2, wherein following said mapping step, the method further includes the step of extracting the server coordinates from the position coordinate address of the video game player.

6. The computer readable medium of claim 2, wherein following said mapping step, the method further includes the step of extracting the server coordinates from the coordinate address of the video game player in response to the motion of the player.

7. The computer readable medium of claim 2, further including the step of adding blocks and independently storing the added blocks on any server.

8. The computer readable medium of claim 7, further including the step of handing off players between servers in response to the motion of the player.

9. The computer readable medium of claim 7, further including the step of load balancing by players naturally moving between servers.

10. The computer readable medium of claim 1, wherein said mapping step includes mapping coordinate address to server coordinates by providing server coordinate addresses.

11. The computer readable medium of claim 10, further including the step of extracting the server coordinate address from the coordinate address utilizing bitwise logic.

12. The computer readable medium of claim 10, further including the step of dynamically re-mapping a coordinate address to different server coordinates.

13. The computer readable medium of claim 1, wherein said defining step includes defining a three dimensional area comprising a virtual online video game space stored on the servers with a coordinate address that represents a video game player's location within the virtual online video game space; and wherein said mapping step includes mapping the coordinate addresses to server coordinate addresses by extracting the server coordinate address from the coordinate address using bitwise logic.

* * * * *